(12) United States Patent
Bozinovic et al.

(10) Patent No.: US 8,897,512 B1
(45) Date of Patent: *Nov. 25, 2014

(54) VIDEO HASHING SYSTEM AND METHOD

(71) Applicant: MotionDSP, Inc., Burlingame, CA (US)

(72) Inventors: Nikola Bozinovic, San Francisco, CA (US); Ivan Velickovic, Nis (RS); Ivan Vuckovic, Nis (RS); Sasa Andjelkovic, Nis (RS); Nebojsa Andjelkovic, Nis (RS); Danilo Djordjevic, Munich (DE)

(73) Assignee: MotionDSP, Inc., Burlingame, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/947,366

(22) Filed: Jul. 22, 2013

Related U.S. Application Data

(62) Division of application No. 12/043,579, filed on Mar. 6, 2008, now Pat. No. 8,494,234.

(51) Int. Cl.
  *G06K 9/00* (2006.01)
  *G06K 9/32* (2006.01)

(52) U.S. Cl.
  CPC .................................. *G06K 9/3241* (2013.01)
  USPC .......................................... 382/124; 382/103

(58) Field of Classification Search
  USPC ................................................. 382/124–127
  See application file for complete search history.

(56) References Cited

U.S. PATENT DOCUMENTS

| | | | |
|---|---|---|---|
| 5,579,054 A | 11/1996 | Sezan et al. | |
| 5,706,417 A | 1/1998 | Adelson | |
| 6,188,780 B1 * | 2/2001 | Nakayama | 382/124 |
| 7,616,787 B2 * | 11/2009 | Boshra | 382/124 |
| 8,494,234 B1 * | 7/2013 | Bozinovic et al. | 382/124 |
| 2004/0042642 A1 * | 3/2004 | Bolle et al. | 382/115 |
| 2004/0086193 A1 | 5/2004 | Kameyama et al. | |
| 2005/0041885 A1 * | 2/2005 | Russo | 382/289 |
| 2005/0175224 A1 * | 8/2005 | Venkatesan et al. | 382/124 |
| 2006/0017837 A1 | 1/2006 | Sorek et al. | |
| 2006/0104540 A1 | 5/2006 | Haussecker et al. | |
| 2009/0141805 A1 * | 6/2009 | Lu et al. | 375/240.24 |

FOREIGN PATENT DOCUMENTS

EP  1014305  9/2004

OTHER PUBLICATIONS

Monga, Vishai, et al., "A Clustering Based Approach to Perceptual Image Hashing", IEEE Trans. Of Information Forensics and Security (Accepted), vol. 1, No. 1, Mar. 2006.

(Continued)

*Primary Examiner* — Alex Liew
(74) *Attorney, Agent, or Firm* — Dov Rosenfeld; Inventek

(57) ABSTRACT

In one embodiment, a method of operating a processing system includes receiving a reference video and calculating global camera motion parameters for a plurality of the reference video's frames. The method further includes using the camera motion parameters to identify reference video frames corresponding to motion-based events, generating hash values for the identified and neighboring frames in the reference video; and storing the identified frames and hash values. In one version, the method also includes receiving a subject video, calculating global camera motion parameters for the frames of the subject video, using these parameters to identify frames of motion-based events in the subject video, and generating hash values for the identified and neighboring frames in the subject video. The identified frames and hash values of the subject can be compared with those stored for the reference video to evaluate similarity.

21 Claims, 8 Drawing Sheets

(56) References Cited

OTHER PUBLICATIONS

Rane, Shantanu, "Hash-Aided Motion Estimation and Rate Control for Distributed Video Coding", EE392J Project Report, Winter 2004.

De Roover, Cedric, et al. "Robust video hashing based on radial projections of key frames" IEEE International Conference on Image Processing, 2005. Sep. 2005.

De Roover, Cedric, et al. "Key-Frame Radial Projection for Robust Video Hashing", Telecommunications and Remote Sensing Laboratory, UCL, Belgium. 2005.

Medioni, G., "Real-Time Billboard Substitution in a Video Stream", TIWDC 1998.

Gauch, John M., et al., "Identification of New Commercials Using Repeated Video Sequence Detection", Sep.

Gauch, John M., et al., "Finding and Identifying Unknown Commercials Using Repeated Video Sequence Detection", Elsevier Science, Inc., Jul. 2006.

Venkatesan, Ramarathnam, et al., "Image Watermarking with Better Resilience", Microsoft Research (USA), Proceedings. 2000 International Conference on Image Processing, 2000.

Coskun, Baris, et al. "Robust Video Hash Extraction", Electrical and Electronic Engineering Department, Bogazici University, Bebek, Istanbul, Turkey., EUSIPCO, Apr. 2004.

Harmanci, Oztan, et al., "Temporal Synchronization of Watermarked Video Using Image Hashing", SPIE, vol. 5681, pp. 370-380, 2005.

Coskun, Baris, et al., "Spatio-Temporal Transform Based Video Hasing", IEEE Transactions on Multimedia, vol. 8, No. 6, Dec. 2006.

Mas, Jordi, et al., "Video Shot Boundary Detection Based on Color Histogram", LaSalle School of Engineering, Ramon Llull University, Barcelona, Spain, 2003.

Quisquater, Jean-Jacques, et al., "Authentication of Sequences with the SL2 Hash Function: Application to Video Sequences", Journal of Computer Security, 1997.

Pua, Kok Meng, et al., "Real Time Repeated Video Sequence Identification", Department of Electrical Engineering and Computer Science, university of Kansas, Computer Vision and Image Understanding, Mar. 2004.

Monga, Vishai, et al., "Perceptual Image Hashing Via Feature Points: Performance Evaluation and Trade-Offs", IEEE Transaction on Image Processing, vol. 15, Issue 11, Nov. 2006.

Park, Sung Cheol, Min Kuy Park and Moon Gi Kang, "Super-Resolution Image Reconstruction: A Technical Overview", IEEE Signal Processing Magazine, May 2003, 1053-5888/03.

Zhang, Zhong and Rick S. Blum, "A Hybrid Image Registration Technique for a Digital Camera Image Fusion Application", Oct. 6, 2000, Electrical Engineering and Computer Science Department, Lehigh University, Bethlehem, PA.

Schultz, Richard R., Li Meng and Robert L. Stevenson, "Subpixel Motion Estimation for Multiframe Resolution Enhancement", SPIE vol. 3024, Visual Communications and Image Processing '97, Jan. 1997, 0277-786X/97.

Takeda, H., S. Farisiu, and P. Milanfar, "Regularized Kernel Regression for Image Deblurring", Proceedings of the $40^{th}$ Asilomar Conference on Signals, Systems and Computers, Nov. 2006.

* cited by examiner

VIDEO HASHING SYSTEM AND METHOD

CROSS-REFERENCE TO RELATED APPLICATION

This application is a divisional of U.S. application Ser. No. 12/043,579, now U.S. Pat. No. 8,494,234. U.S. application Ser. No. 12/043,579 claims priority to U.S. Provisional Application Ser. No. 60/893,483, filed Mar. 7, 2007, titled "Video Hashing using Global Camera Motion." The contents of each of application Ser. Nos. 12/043,579 and 60/893,483 are incorporated by reference herein in their entirety for all purposes. The contents of the following commonly-owned utility application are also incorporated by reference in their entirety for all purposes: U.S. patent application Ser. No. 11/678,998, titled "Enhancing the Resolution and Quality of Sequential Digital Images", filed on Feb. 26, 2007, now U.S. Pat. No. 8,279,341.

BACKGROUND

Hash functions are widely used in cryptography, where the main purpose is to check the integrity of the data. Since the resulting hash value is highly sensitive to every single bit of the input, these functions are extremely fragile and cannot be adopted for hashing multimedia data. In multimedia hashing, it is more important to be sensitive to the content rather than the exact binary representation. For instance, the raw video, its compressed version, its low-pass filtered version, its increased brightness version, and its decreased contrast version should yield the same hash value since their content is essentially the same but their binary forms are very different. So, an alternate way to compute the hash is needed for multimedia applications, where the hash function results in the same output value unless the underlying content is significantly changed.

Such a hash function is known as a robust or perceptual hash function. Some of the applications of perceptual video hashing include the following: (1) automatic video clip identification in a video database or in broadcasting; (2) online search in a streaming video; (3) authentication of the video content; and (4) content-based watermarking. The two desired properties of hash functions for multimedia data are robustness and uniqueness. Robustness implies that the hash function should be insensitive to perturbations, non-malicious modifications caused by "mild" signal processing operations that in total do not change the content of the video sequence. These modifications can be caused by the user, such as MPEG compression. Or contrast enhancement can occur during storage and transmission functions, such as transcoding or packet drops. The uniqueness property implies that the hash functions are statistically independent for different content, so that any two distinct video clips result in different and apparently random hash values. See also Buis Coskun and Bulent Sankur, *Spatio-Temporal Transform Based Video Hashing*, IEEE Transactions on Multimedia, Vol. 8, No. 6 (December 2006).

Image registration is the process of estimating a mapping between two or more images of the same scene taken at different times, from different viewpoints, and/or by different sensors. It geometrically aligns two images—the reference image and the so-called "matching" image. Generally, there are two categories of image differences that need to be registered. Differences in the first category are due to changes in camera position and pose. These sorts of changes cause the images to be spatially misaligned, i.e., the images have relative translation, rotation, scale, and other geometric transformations in relation to each other. This category of difference is sometimes referred to as global transformation or global camera motion (GCM).

The second category of differences cannot be modeled by a parametric spatial transform alone. This category of differences can be attributed to factors such as object movements, scene changes, lighting changes, using different types of sensors, or using similar sensors but with different sensor parameters. This second category of differences is sometimes referred to as independent object motion or local object motion (LOM). Such differences might not be fully removed by registration due to the fact that LOM rarely conforms to the exact parametric geometrical transform. In addition, the innovation that occurs in video frames in the form of occlusion and newly exposed area cannot be described using any predictive model. In general, the more LOM- or innovation-type differences exist, the more difficult it is to achieve accurate registration. See Zhong Zhang and Rick S. Blum, *A Hybrid Image Registration Technique for a Digital Camera Image Fusion Application*, Information Fusion 2 (2001), pp. 135-149.

Parametric coordinate transformation algorithms for registration assume that objects remain stationary while the camera or the camera lens moves; this includes transformations such as pan, rotation, tilt, and zoom. If a video sequence contains a global transformation between frames, the estimated motion field can be highly accurate due to the large ratio of observed image pixels to unknown motion model parameters. A parametric model which is sometimes used to estimate the global transformation that occurs in the real world is the eight-parameter projective model, which can precisely describe camera motion in terms of translation, rotation, zoom, and tilt. To estimate independent object motion, Horn-Schunck optical flow estimation is often used though it often requires a large number of iterations for convergence. See Richard Schultz, Li Meng, and Robert L. Stevenson, Subpixel Motion Estimation for Multiframe Resolution Enhancement, Proceedings of the SPIE (International Society for Optical Engineering), Vol. 3024 (1997), pp. 1317-1328, as to the foregoing and the details of the eight-parameter projective model.

SUMMARY

In particular embodiments, the present invention provides methods, apparatuses, and systems directed to video hashing. Video hashing can be used to identify video content in a first video data file with video content of a second video data file. In a particular implementation, video matching or video content identification can be divided into two phases: Feature Extraction and Matching. During a feature extraction phase video material is analyzed and a video fingerprint is generated. The video fingerprint may comprise one video hash or multiple video hashes generated using different video hashing algorithms. One video hashing algorithm that can be used analyzes global camera motion parameters to detect events in the video content. In one embodiment, calculation of global camera motion is based on an eight-parameter projective model. In addition, binary descriptors extracted from one or more video frames associated with detected events can also be generated to enhancing the matching. Other video hashing algorithms can employ color histograms and other analytical methods to identify events or extract features used in video fingerprints. In a matching phase, query and reference fingerprints are compared to find matching video content in a database (if such exists) that corresponds to the query video.

DESCRIPTION OF EXAMPLE EMBODIMENT(S)

The following example embodiments are described and illustrated in conjunction with apparatuses, methods, and systems which are meant to be examples and illustrative, not limiting in scope.

A. System Architecture for Video-Hashing System

Figure 1:
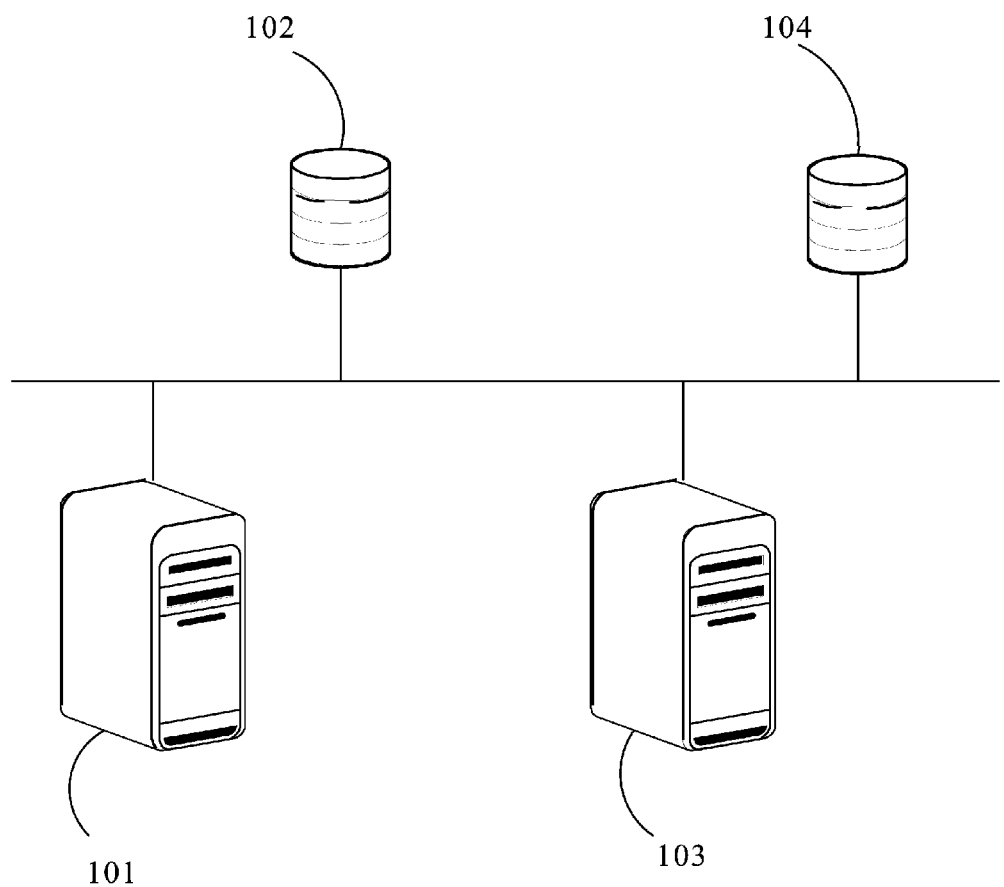
FIG. 1 is a diagram showing a system architecture for a video-hashing system, which system might be used in some embodiments of the present invention.

FIG. 1 is a diagram showing a system architecture for a video-hashing system, which system might be used in some embodiments of the present invention. As shown in FIG. 1, a video-hashing system might be comprised of an upload server 101 which uploads videos from other servers or client devices (such as desktop/laptop computers, mobile telephones, etc) and stores the uploaded videos in a video database 102. In some embodiments, video-hashing server 103 might access the uploaded videos in database 102 and process them using some of the processes described below to generate video fingerprints for later matching operations. The results of those processes might then be stored in a database 104 for later use by video-hashing server 103 (or another video-hashing server) when generating matching scores for subject videos from upload server 101 or video database 102.

B. System Architecture for Video-Hashing Server

Figure 2:
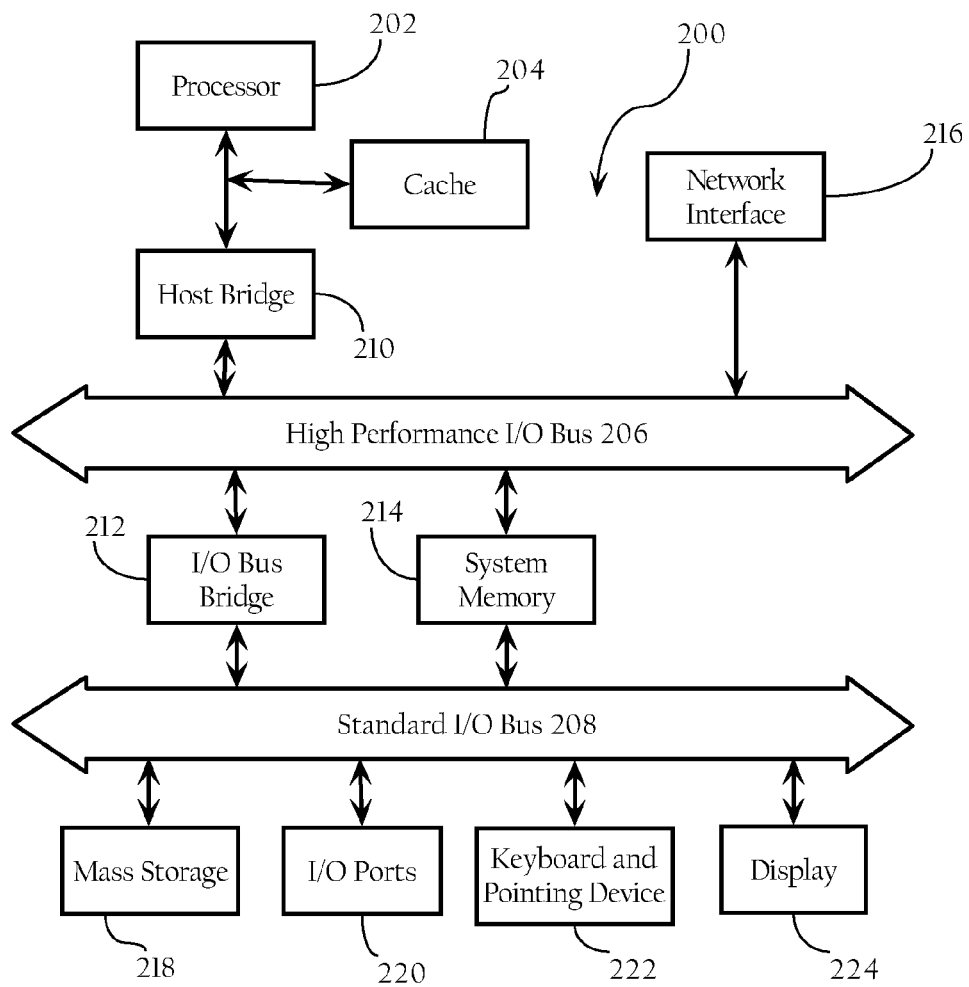
FIG. 2 is a diagram showing a system architecture for a video-hashing server, which server might be used in some embodiments of the present invention.

FIG. 2 illustrates, for didactic purposes, a hardware system 200, which might be a part of a video-hashing server that runs the processes described below, in particular embodiments. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. In some, but not all, embodiments, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In particular embodiments, the processes described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Linux operating system. However, the present invention may be used with other suitable operating systems, such as the Windows® 95/98/NT/XP operating system, available from Microsoft Corporation of Redmond, Wash., the Apple Macintosh Operating System, available from Apple Computer Inc. of Cupertino, Calif., UNIX operating systems, and the like.

C. Generating Video Fingerprints

A video fingerprint, in one implementation, comprises one or more video hashes resulting from application of one or more video hashing algorithms to video data. The following illustrates three different video hashes that can be used individually, or in combination, to create a video fingerprint. As discussed below, video hashes can be constructed based on event detection, where events are detected based on analysis of global camera motion or other techniques, such as color histogram difference approaches. Furthermore, other types of video hashes can rely on sampling video frames at a constant or predetermined interval. In either the event-based or predetermined sampling approaches, the video hashes can incorporate binary descriptors extracted from analysis of one or more video frames associated with either a detected or sampled event.

The different video hash types discussed below can be used individually or in combination. When matching a subject and reference video hash, a matching score may be generated and compared to other matching scores to declare a match. When using different video hash types in combination, each matching score may contribute to an aggregate matching score. In other implementations, the different video hashes may be applied in series, where a subsequent video hash type (e.g., scene cut detection) is used if application of a first video hash type (e.g., global camera motion) did not result in a match.

C.1. Global Camera Motion

A challenge for any video-hashing or video-matching system is how to temporally segment a video in order to make a hash-search feasible. See John M. Gauch, and Abhishek Shivadas, Finding and Identifying Unknown Commercials Using Repeated Video Sequence Detection, Computer Vision and Image Understanding (CVIU), Vol. 103, No. 1 (June 2006). Analysis of video motion can assist in this segmentation task. In some instances, a lack of appropriate correspondence between successive frames can be used to define discrete scenes and assign temporal segments to a series of hashes. In other instances, significant and reliable changes of motion within the same scene can be used to assign temporal segments. When performing video hashing, one might use changes in the sign of translational parameters for global camera motion to perform intrinsic temporal segmentation within scenes.

Figure 3:
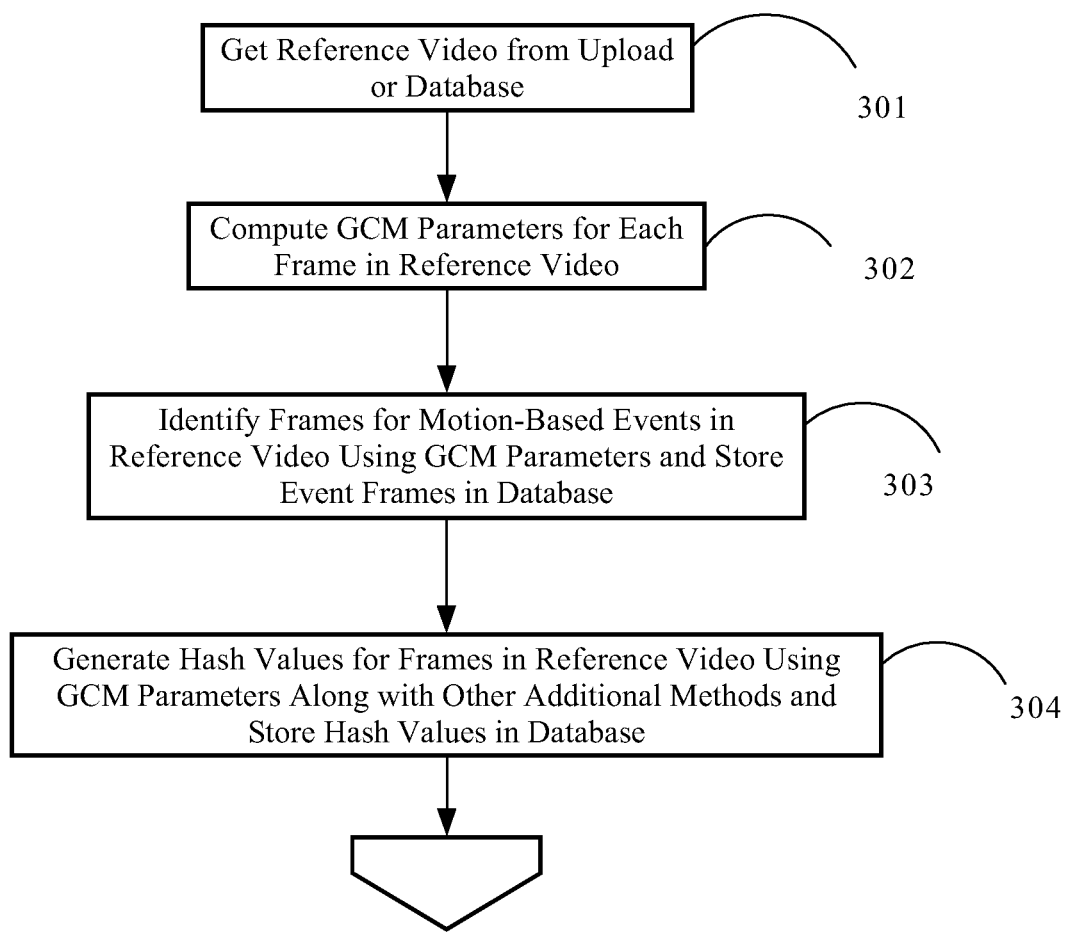
FIG. 3 is a diagram showing a flowchart of a process for generating a hash value for a video, which process might be used in some embodiments of the present invention.

FIG. 3 is a diagram showing a flowchart of a process for generating a hash value for a video, which process might be used in some embodiments of the present invention. In the process's first step 301, the video-hashing server 103 gets a reference video from an upload (e.g., the upload server) or from a database. In step 302, the video-hashing server 103 computes GCM parameters for a set of frames in the reference video, using the eight-parameter projective model described above. Then in step 303, the video-hashing server 103 identifies the frames for motion-based events in the reference video, using those GCM parameters, and stores the event frames in a database. In step 304, the process generates hash values for some (e.g., the event frames and the frames in their matching windows) or all of the frames in the reference video, using the GCM parameters and other additional methods, and stores the hash values in a database.

When identifying event frames in step 303, the video-hashing server 103 might use the GCM parameters computed in step 302, in some embodiments. As explained below, these parameters permit the calculation of a matching window around each frame which might be used to identify scene cuts. Additionally, as indicated above, a motion-based event might not be a scene cut, but rather a directional change in motion in either the horizontal or vertical direction (e.g., back-and-forth or up-and-down). To detect such changes, a process might, in some embodiments, locate a zero-crossing in a plot of a translational parameter's time series from frame to frame (e.g., a moment in x or in y where there is a sign change for the first derivative), where the plot is monotonically decreasing on both sides around the zero-crossing (e.g., the change in motion is not transitory). Here it will be appreciated that the eight-parameter projective model includes two translational parameters, e.g., x (horizontal) and y (vertical).

Further, when generating hash values from frames in step 304, the video-hashing server 103 might use the GCM parameters both directly and indirectly, in some embodiments. For example, a hash value for a frame might be comprised of (a) the eight parameters calculated using the eight-parameter projective model, and (b) a two-vector element that defines the matching window around the frame (e.g., the length of the matching window preceding and following the frame). In some embodiments, this hash value might be extended to use concatenated motion parameters for non-adjacent frames and arrays of evaluated motion parameters (motion vectors) for predefined (e.g., center of the frame) or dynamically assigned points. Through the use of such extensions, the hash value can carry information about the local temporal neighborhood of a frame, providing the overlap between hash values that facilitates reliable matching. Further, in some embodiments, the hash value might be extended by adding more GCM parameters expressed in units that are relative to video resolution (frame size).

Also, as noted above, the hash value generated in step 304 might be additionally comprised of the results from other image-hashing methods (e.g., based on pixel statistics), in some embodiments, on the event frames. In particular embodiments, the other additional methods might include hashing functions that use color histograms, Fourier transforms, wavelet transforms, etc.

In one implementation, the set of motion-based events detected through analysis of global camera motion may be associated with a timeline array (see below) to form a motion-based video hash of the video content. This timeline array may be matched against timeline arrays of other videos to compute a matching score for the purposes of identifying a subject video against a database of reference videos. Still further, one or more video frames associated with the detected events may be processed to generate binary descriptors for the frames. As discussed below, matching of such a video hash involves correlation of time line arrays, and then matching of binary descriptors extracted from video frames that correspond to matching events in the correlated timeline arrays.

C.1.a. Process for Determining Global Camera Motion

Figure 5:
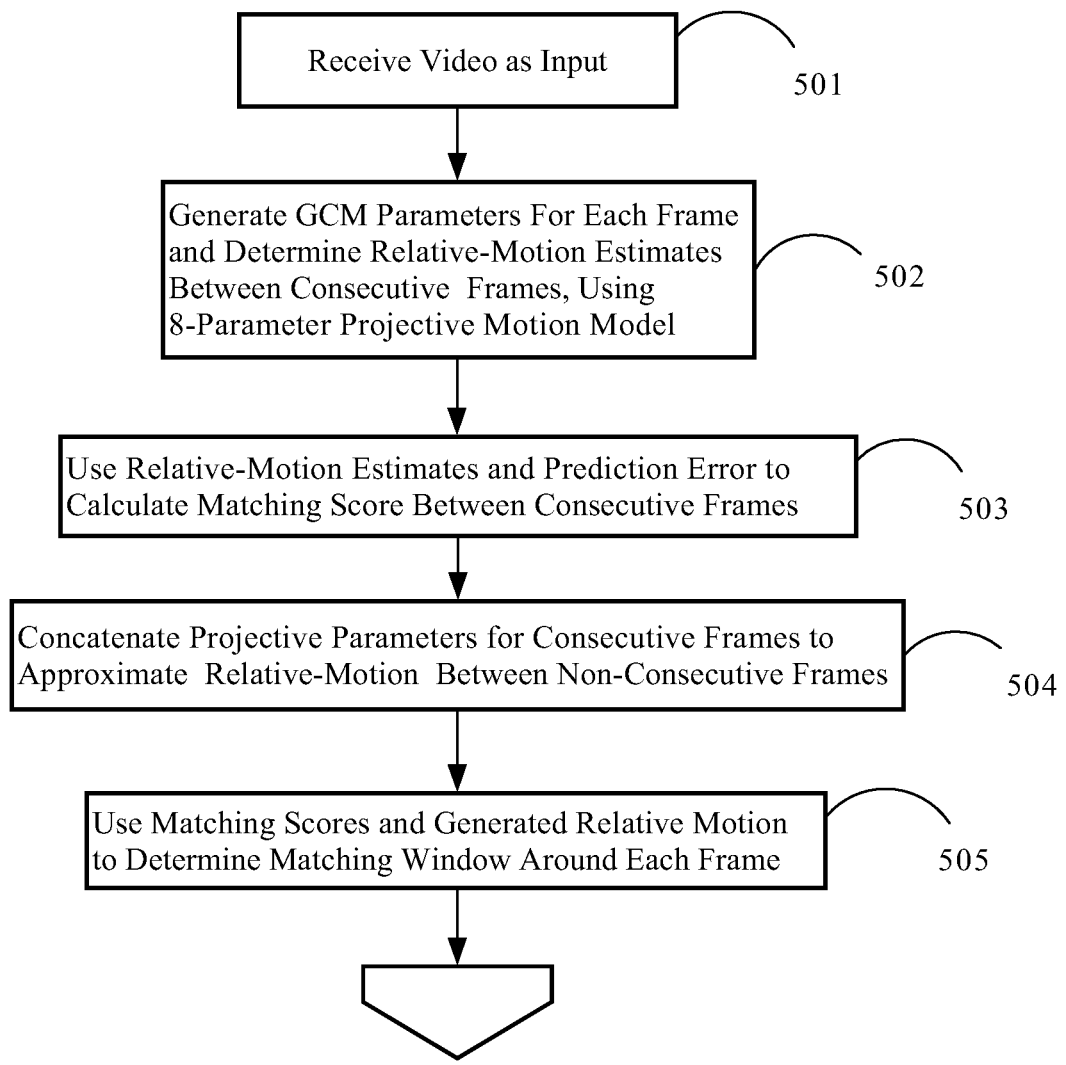
FIG. 5 is a diagram showing a flowchart of a process for determining GCM parameters, which process might be used in some embodiments of the present invention.

In the process shown in FIG. 3, the video-hashing server 103 computes GCM parameters for each frame in a reference video. FIG. 5 is a diagram showing a flowchart of a process for determining GCM parameters, which process might be used with some embodiments of the present invention. The input to the process is a video, which need not be an encoded bit stream such as MPEG-4. If the video happens to be an encoded bit stream, the process uses information provided in the encoding to enhance performance, e.g., through the adjustment of initial values with respect to parameters of the algorithm, like the number of matching frames, etc.

Figure 6:
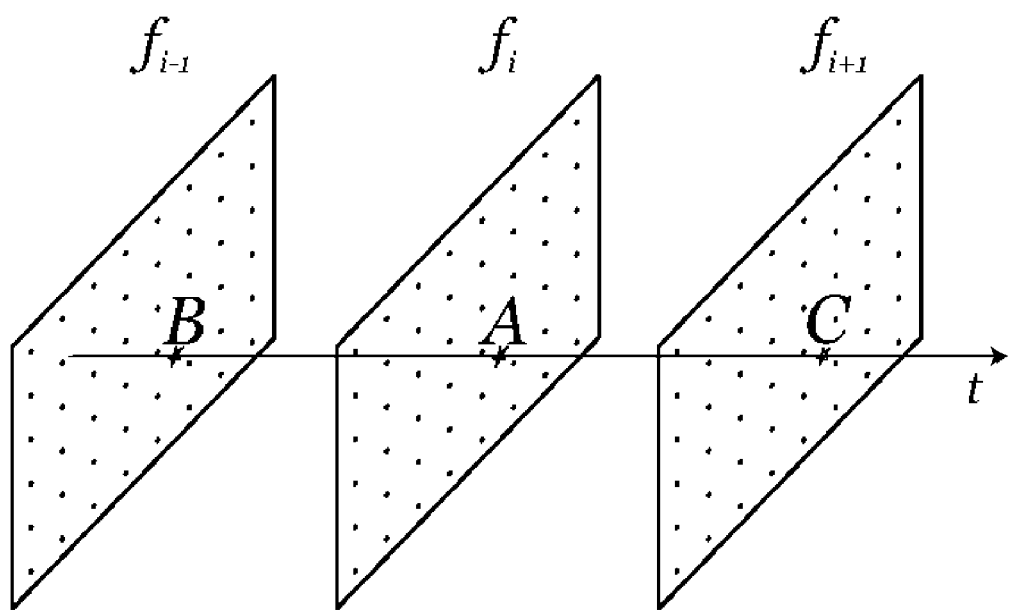
FIG. 6 is a diagram illustrating a matching window from a process for determining global camera motion, which process might be used in some embodiments of the present invention.

In step 501 of the process shown in FIG. 5, the process receives the video as input, as just noted. In step 502, the process generates GCM parameters for each frame and determines relative-motion estimates between consecutive frames, through the use of the eight-parameter projective motion model described earlier. In step 503, the process uses the relative-motion estimate and motion-compensated prediction error to calculate a "matching score" between consecutive frames. The matching score is a function of the prediction error. In step 504, the process concatenates the projective parameters for consecutive frames to approximate relative-motion between non-consecutive frames. Then in step 505, the matching scores and the generated relative-motion are used by the process to determine a "matching window" around each frame (i.e., the number and the position of matching frames) that should be used. For example, a matching window of size 3 is illustrated in FIG. 6, where t represents the temporal axis. The size of this window might be set to be less or equal than a pre-determined maximum number, in some embodiments.

The example processes described above use GCM for both identifying event frames and generating hash values. Other embodiments of the invention might use GCM in combination with LOM and/or optical flow estimation for these two functional steps. For example, particular embodiments might employ a hash value consisting of a GCM vector (8 elements), a number of identified objects in the scene (up to a preset limit), a LOM for each identified object, and a spatial distribution of identified objects. In this regard, see the related patent application, incorporated by reference. The hash value might also be extended with additional multi-frame descriptors.

C.2. Scene-Cut Detection & Predetermined Frame Sampling

Video hashes can also be constructed around scene cut detection and/or selected or predetermined sampling of video frames. Analysis of one or more frames associated with detected scene cuts, or according to a pre-determined sampling profile (e.g., constant sampling interval) can be used to generate binary descriptors. Color or Luminance Histogram Differencing techniques may be used to detect scene cuts. Using Color Histogram Difference (CHD), frames with significant frame-to-frame change in color space distribution are detected. A video hash can be formed as a sequence of pairs (timestamp, value), where the timestamp is a scene cut reference time in the video (in milliseconds, for example) and the value can be any additional information corresponding to the event. For example, this additional value information may be a binary descriptor (see below) extracted from the video frame before and the video frame after a detected scene change (i.e., the frames on opposite sides of the scene cut).

Still further, a second approach to generating a video hash can involve extracting information from video frames at a selected sampling interval. In a particular implementation, one such sampling-based approach generates binary descriptors for video frames at a constant sampling interval. For example, a constant sampling interval can be set to 1 second. For each sampled frame, a video hash can be formed by generating a binary descriptor for each sampled video frame, and concatenating or otherwise grouping them to form a video hash value.

C.2.a. Binary Descriptor

A binary descriptor is a multi-bit value resulting from application of one or more algorithms applied to the data corresponding to a video frame. In a particular implementation, a binary descriptor is a 16-bit value that is extracted from the luminance plane of video data in the following way:

a) a video frame is divided into 16 (4×4) non-overlapping tiles of approximately the same size;
b) for each tile, the average luminance is calculated;
c) a global threshold is applied across all tiles. If the average luminance in the tile is larger than the global threshold value, a binary 1 is assigned to a tile, otherwise, the tile is assigned a binary 0. Various values can be use to determine the global threshold value, such as the average luminance for the entire frame (or across a set of frames);
d) a 16-bit binary word is formed by concatenating all binary tile representations.

In testing conducted by the inventors, binary descriptors generated by this approach have shown resilience to common attacks such as contrast/brightness/gamma correction, cropping, perspective, bit rate or resolution change, and cinema recording.

D. Process for Matching Videos Using Hash Values

As discussed above, video fingerprints for a plurality of reference videos may be stored in a database and used later for possible matches against a subject or query video. The descriptiveness of a given fingerprint depends on video material used for generation. Highly dynamic videos naturally have higher entropy; accordingly, fingerprinting may offer more representative (unique) characterization of the video material, which allows shorter segments of the reference video to be used. In other words, this means that shorter clips may be used as queries. In other implementations, reference video may be broken into a plurality of segments and individually processed for fingerprints and matched against subject video content.

D.1. Camera-Motion Based Hash

Figure 4:
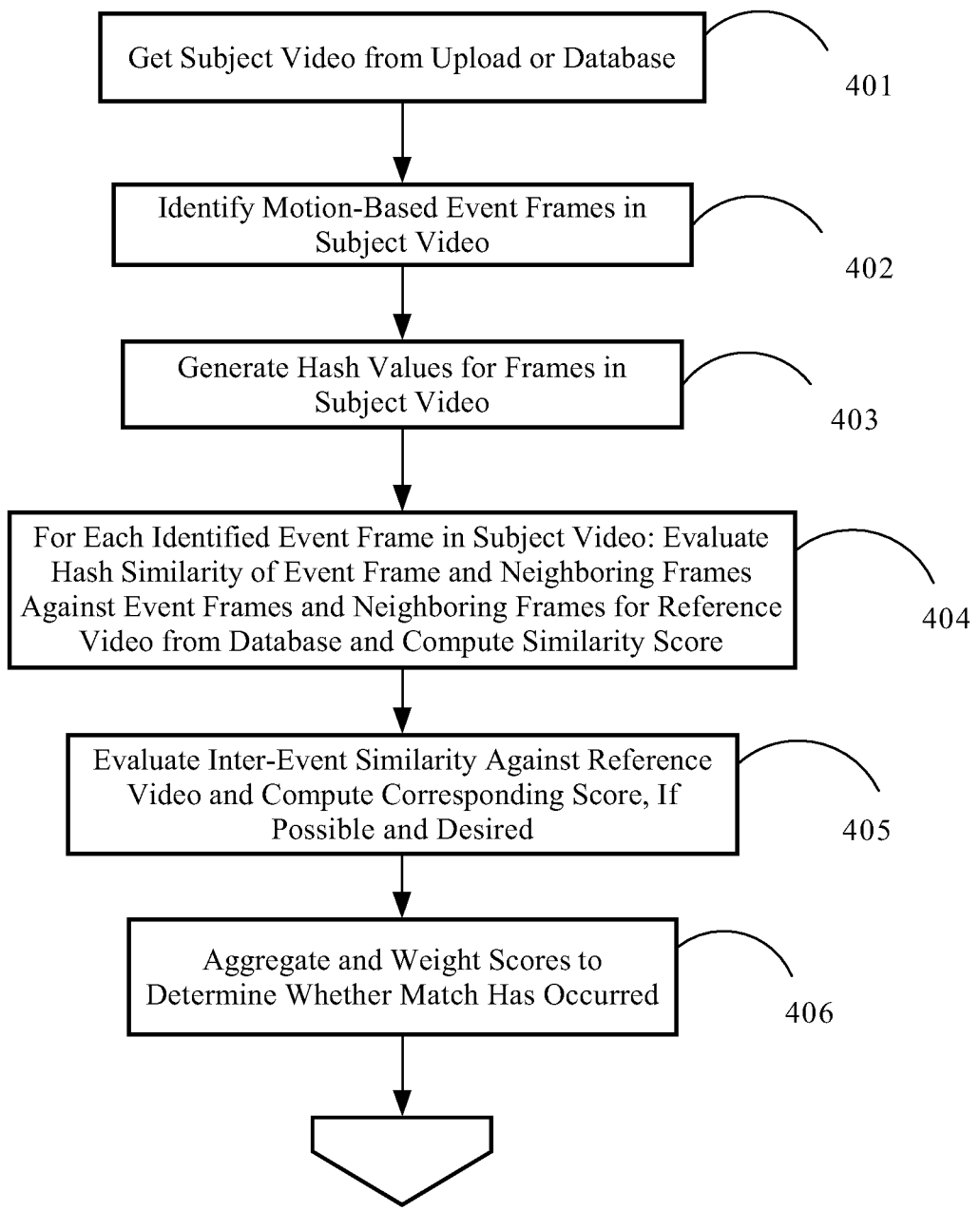
FIG. 4 is a diagram showing a flowchart of a process for generating matching videos using hash values, which process might be used in some embodiments of the present invention.

FIG. 4 is a diagram showing a flowchart of a process for generating matching videos using hash values, which process might be used in some embodiments of the present invention. In the process's first step 401, the process gets a subject video from an upload (e.g., the upload server) or a database. In step 402, the process identifies the motion-based event frames in the subject video, using the processes described above. And in step 403, the process generates hash values for some (e.g., the event frames and the frames in their matching windows) or all of the frames in the subject video, again using the processes described above. In step 404, the process iterates over each identified event frame and evaluates the hash similarity of the event frame and its neighboring frames against the event frames and neighboring frames for a reference video. In this step, the process will make use of the event frames and hash values for the reference video, which were previously generated and stored using a process similar to the one shown in FIG. 3. Also in this step 404, the process shown in FIG. 4 will compute a similarity score for each event frame identified in the source video. When computing this score, the process might use Hamming distance or weighted Hamming distance, in some embodiments. Then in step 405, the process evaluates the inter-event similarity of the subject video and the reference video (e.g., using each video's event frames) and computes a corresponding score. In some cases, this step will not be possible, for example, when the event frames in the subject video are far fewer than the event frames in the reference video. Additionally, in some cases, this step might not be desired, e.g., by the application making use of the process. Finally, in step 406, the process aggregates and weights the scores from steps 404 and 405 to determine whether a match has occurred. Inter-event similarity can be assessed, as discussed below, using timeline arrays and correlation analysis.

D.2. Matching of Scene Cut Video Hashes

Figure 7:
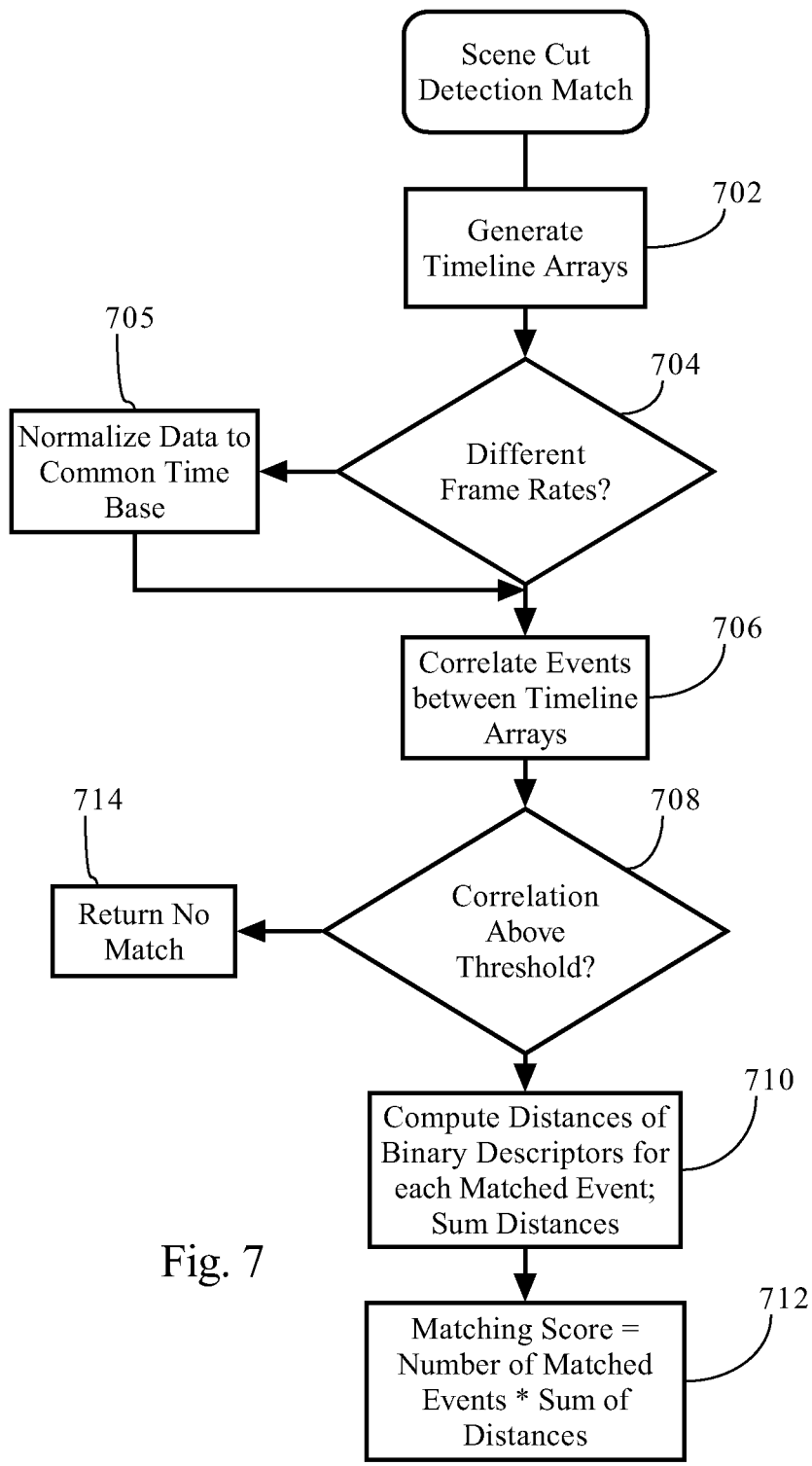
FIG. 7 is a flow chart illustrating a process for matching using video hashes.

FIG. 7 illustrates an example method that may be used to compute a matching score between two videos using video hashes based on scene cut detection and extraction of binary descriptors. For the subject video and a reference video, the scene-cut video hashes are converted into timeline arrays, where each entry in the array corresponds to a frame (702). The occurrence of a scene-cut event is coded as a '1' at appropriate time elements of the array, while the absence of an event at a time element of the array is coded as a '0.' If Feature Sequences are of two files that are being matched have different frame-rate, a reduction (normalization) to a common time base may be required (704, 705).

An algorithm for pattern search can be used for matching the time line arrays, for example, one based on Fast Fourier Transform (FFT)-computed correlation (706). If the maximum correlation value from the resulting correlation vector is above a configured threshold (which may be empirically determined) (708), then additional matching operations are performed to yield a matching score. For each matched event across the timeline arrays, a Hamming distance between the appropriate binary descriptors is calculated (710). A complemented Hamming distance can be computed based on the number of bits of the binary descriptor less the Hamming distance. The sum of all complemented Hamming distances determines the level of disparity between the subject and reference videos. A final matching score can be computed by multiplying the number of matched events with the sum of complemented Hamming distance for all matched features, and by normalizing the resulting value based on a scale of 0 to 1 (0 to 100%) (712). For example, if there were 10 features in a subject video clip and the binary descriptor is a 16-bit value, the maximum sum of complemented Hamming distances for all events is 160 (assuming a perfect match, Hamming distance for each event is 0 (zero), complemented Hamming distance is 16 and for all events this sums up to 160). For a sample subject video, the aggregate complemented Hamming distance may be 147, in which case the normalized score is 147/160=91.875%. A subject video may be compared to a database of reference videos. The reference video with the maximum score, or the top N reference videos, may be presented as possible candidates. Thresholding, and comparisons between scores of the pool of candidates, can be used to decide whether to select a reference video as a match or to reject all candidates.

D.3. Matching in Constant Sampling Approach

Figure 8:
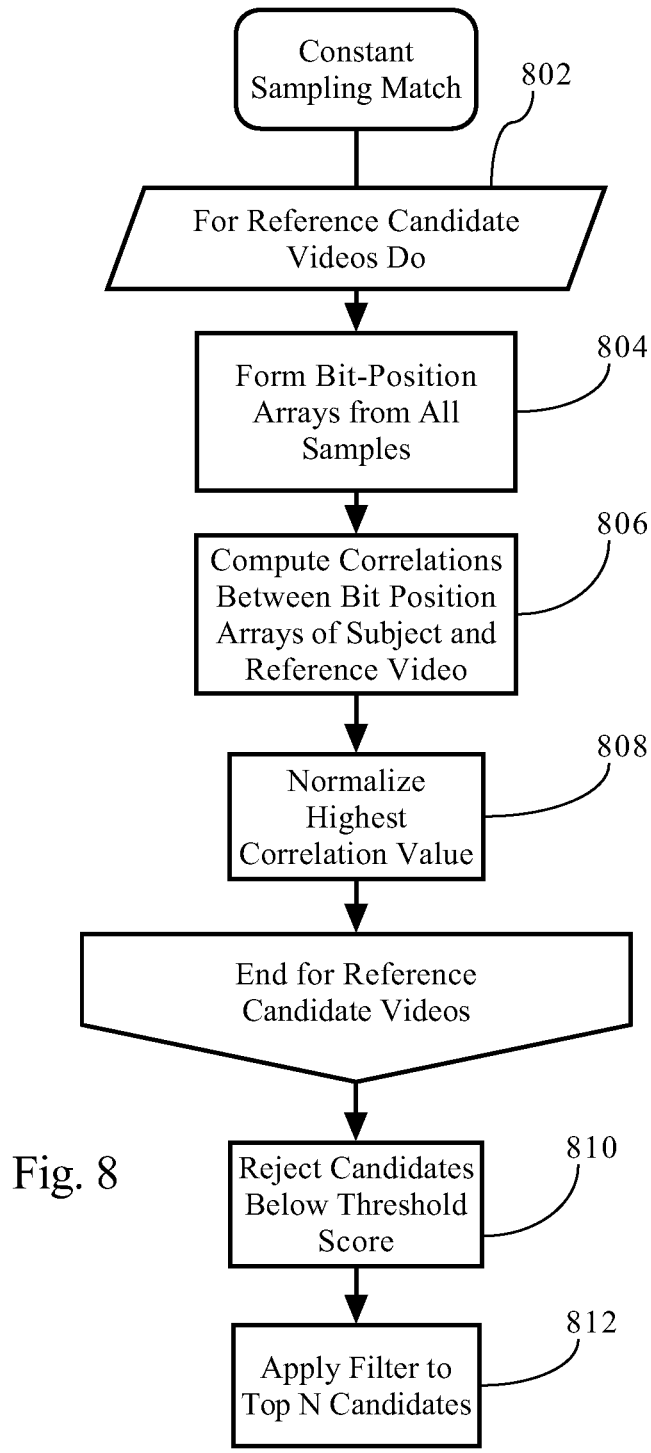
FIG. 8 is a flow chart illustrating another process for matching using video hashes.

FIG. 8 illustrates a process flow for matching videos based on video hashes generated using the constant sampling methodology discussed above. Overall, the matching process computes matching scores between the subject video and a set of reference candidate videos (see loop starting with 802 to 808), rejects reference candidate videos have a matching score below a threshold (810), and applies a filter algorithm to the remaining candidates to accept a reference video as a match or return no match (812).

To compute a matching score between a subject video and a reference video, the matching engine forms, for the subject and reference videos, a matrix of the binary descriptors across all samples, such that the first bit from each 16-bit binary descriptor is aligned in a column (or, in other implementations, a row). The formed matrix is an N×M array, where N is the number of bits in the binary descriptor and M is the number of samples. For didactic purposes, each column of the matrix is referred to herein as a bit-position array. In a particular implementation, the values in each array are converted such that binary 1s are represented as a positive 1, and binary 0s are represented as negative 1s. FFT is then used to calculate a correlation vector between the matrices extracted from the reference and subject videos. As multi-dimensional correlation is a linear operation, all correlation results for each individual bit-position array can be summed together to obtain one correlation vector per subject-reference video pair. Among all results of this process, the maximum correlation value is selected, normalized within a range (see above) and used as a matching score. As discussed above, a threshold may be applied to reject reference candidate videos having insufficient matching scores (810). The matching engine may then apply a selection filter to the remaining reference videos (812).

In a particular implementation, the remaining reference videos are then processed jointly in the final phase of the algorithm. In a particular implementation, three candidate reference videos with the top matching scores are selected and the difference between them is subjected to a "filtering formula". For example, assume that matching scores of the top three candidates are m1>=m2>=m3. The candidate reference video with score m1 is accepted if-and-only-if (m1−m2)>=k*(m2−m3), where k represents some empirically determined constant. If this condition is not satisfied, the result of matching process is declared as "no_match_found" (to assist in preventing false positives).

Particular embodiments of the above-described processes might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media, also referred to as non-transitory computer-readable media, are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many possible orderings of the steps in the processes described above. As a result, the invention is not limited to the specific examples and illustrations discussed above.

What is claimed is:

1. A method of operating a first processing system that includes one or more processors and storage, the method comprising:

providing as input to the processing system a reference video comprising an ordered time sequence of frames;

calculating using at least one of the processors global camera motion parameters for a plurality of the frames of the reference video;

identifying events using at least one of the processors, including identifying frames corresponding to scene-change-based and/or motion-based and/or sub-sampling-based events in the reference video, the identifying the frames of motion-based events using the global camera motion parameters calculated for the reference video;

generating using at least one of the processors hash values for the identified frames and their neighboring frames in the reference video, the hash values comprising, for each identified event, one or more binary descriptors for one or more frames of the frames that correspond to the identified event; and storing in in the storage the identified frames of the reference video and the generated hash values for the reference video, wherein the identifying the frames in the reference video includes identifying frames corresponding to one or more of a change-of-motion-based reference-video event identified by detecting a change of motion in the sequence, a sub-sampling-based reference-video event determined by sub-sampling in time the ordered time sequence according to a pre-determined sampling profile, and a detected change-of-scene-based reference-video event, such that the stored identified frames and stored hash values are retrievable to be used for evaluating a measure of similarity of a video and the reference video.

2. A method as recited in claim 1, further comprising additional steps carried out by hardware comprising the first processing system or a second processing system coupled to the first processing system, or a:

receiving as input a subject video comprising a time sequence of subject-video frames;

calculating global camera motion parameters for the subject video for each frame of the subject video;

identifying subject video frames corresponding to events including at least motion-based subject video events in the subject video, the identifying of the subject video frames corresponding to the motion-based subject video events using the global camera motion parameters calculated for the subject video, wherein the identifying the frames in the subject video includes identifying frames corresponding to one or more of a change-of-motion-based subject-video event identified by detecting a change of motion in the sequence, a sub-sampling-based subject-video event determined by sub-sampling in time the ordered time sequence according to the pre-determined sampling profile, and a detected change-of-scene-based subject-video event;

generating subject video hash values for the identified subject video frames and their neighboring frames in the subject video, using the global camera motion parameters calculated for the subject video; and evaluating a measure of similarity of the subject video and the reference video by a process that includes comparing identified subject video frames and the generated subject video hash values with the stored identified reference-video frames and stored reference-video hash values.

3. A method of operating a processing system, comprising:

providing as input to the processing system a first fingerprint generated by a process comprising video hashing a first video data set, the set comprising a first ordered time sequence of frames of a first video, the first fingerprint comprising one or more video hash values of the first video data set, providing as input to the processing system a second video data set comprising a second ordered time sequence of frames of a second video;

generating in the processing system a second fingerprint of the second video data set by a process comprising video hashing the second video data set, the second fingerprint comprising one or more video hash values of the second video data set; and comparing on the processing system the first and second fingerprints of the first and second video data sets, wherein the video hashing of a video data set that comprises an ordered time sequence of frames of video includes:

analyzing the video data set to identify one or more events in the ordered time sequence, an identified event comprising one or more of a change-of-motion-based event identified by detecting a change of motion in the sequence, a sub-sampling-based event determined by sub-sampling in time the ordered time sequence according to a pre-determined sampling profile, and a detected change-of-scene-based event; and generating, for each identified event, one or more binary descriptors for one or more frames of the video data set that correspond to the identified event.

4. A method as recited in claim 3 wherein analyzing the video data set comprises calculating global camera motion parameters for a plurality of frames of the video data set, and identifying frames corresponding to change-in-motion-based events including detecting change in motion using the global camera motion parameters calculated for the video data set.

5. A method as recited in claim 3 wherein analyzing the video data set comprises sub-sampling in time the ordered time sequence according to a pre-determined sampling profile, such that the generating includes calculating binary descriptors for a plurality of frames of the first video data set corresponding to the sub-sampling.

6. A method as recited in claim 3 wherein analyzing the video data set comprises identifying scene-cut events and frames corresponding to the scene-cut events by detecting changes of scene in the video data set.

7. A method as recited in claim 3 wherein generating one or more binary descriptors for one or more frames of the video data set that correspond to an identified event comprises:

dividing a video frame corresponding to the identified event into tiles;

calculating the average luminance for each tile; and applying a global threshold across the tiles to form a binary word comprising a plurality of bits, wherein each bit corresponds to one of the tiles, and wherein a first bit value indicates an average luminance of the tile above the global threshold, while the opposite bit value to the first bit value indicates an average luminance of the tile below or equal to the global threshold.

8. A method as recited in claim 3 wherein comparing the first and second fingerprints comprises correlating a first time line of events and a second time line of events indicative of the times of identified events of the first and second fingerprints, respectively.

9. A method as recited in claim 3 wherein comparing the first and second fingerprints comprises correlating a first time line of events and a second time line of events indicative of the times of identified events of the first and second fingerprints, respectively, matching identified events from the first time line to identified events of the second time line, and comparing binary descriptors corresponding to frames associated with the matched identified events.

10. A method as recited in claim 3 wherein comparing the first and second fingerprints comprises generating a score characterizing a degree to which the first and second fingerprints match.

11. One or more non-transitory computer-readable media comprising computer-readable instructions operative, when executed, to cause one or more processors of a processing system to:

accept as input to the processing system a first fingerprint generated by a process comprising video hashing a first video data set, the set comprising a first ordered time sequence of frames of a first video, the first fingerprint comprising one or more video hash values—of the first video data set;

accept as input to the processing system a second video data set comprising a second ordered time sequence of frames of a second video;

generate a second fingerprint of the second video data set by a process comprising video hashing the second video data set, the second fingerprint comprising one or more video hash values of the second video data set; and compare the first and second fingerprints of the first and second video data sets, wherein the video hashing of a video data set that comprises an ordered time sequence of frames of video includes:

analyzing the video data set to identify one or more events in the ordered time sequence, an identified event comprising one or more of a change-of-motion-based event identified by detecting a change of motion in the sequence, a sub-sampling-based event determined by sub-sampling in time the ordered time sequence according to a pre-determined sampling profile, and a detected change-of-scene-based event; and generating, for each identified event, one or more binary descriptors for one or more frames of the video data set that correspond to the identified event.

12. One or more non-transitory computer-readable media as recited in claim 11 wherein analyzing the video data set comprises calculating global camera motion parameters for a plurality of frames of the video data set, and identifying frames corresponding to change-in-motion-based events including detecting change in motion using the global camera motion parameters calculated for the video data set.

13. One or more non-transitory computer-readable media as recited in claim 11 wherein analyzing the video data set comprises sub-sampling in time the ordered time sequence according to a pre-determined sampling profile, such that the generating includes calculating binary descriptors for a plurality of frames of the first video data set corresponding to the sub-sampling.

14. One or more non-transitory computer-readable media as recited in claim 11 wherein analyzing the video data set comprises identifying scene-cut events and frames corresponding to the scene-cut events by detecting changes of scene in the video data set.

15. One or more non-transitory computer-readable media as recited in claim 11 wherein generating one or more binary descriptors for one or more frames of the video data set that correspond to an identified event comprises:

dividing a video frame corresponding to the identified event into tiles;

calculating the average luminance for each tile; and applying a global threshold across the tiles to form a binary word comprising a plurality of bits, wherein each bit corresponds to one of the tiles, and wherein a first bit value indicates an average luminance of the tile above the global threshold, while the opposite bit value to the first bit value indicates an average luminance of the tile below or equal to the global threshold.

16. One or more non-transitory computer-readable media as recited in claim 11 wherein comparing the first and second fingerprints comprises correlating a first time line and a second time line indicative of the times of identified events of the first and second fingerprints, respectively.

17. One or more non-transitory computer-readable media as recited in claim 11 wherein comparing the first and second fingerprints comprises correlating a first time line and a second time line indicative of the times of the identified events of the first and second fingerprints, respectively, matching identified events from the first time line to identified events of the second time line, and comparing binary descriptors corresponding to frames associated with the matched identified events.

18. One or more non-transitory computer-readable media as recited in claim 11 wherein comparing the first and second fingerprints comprises generating a score characterizing a degree to which the first and second video fingerprints match.

19. A system comprising:

a hardware system comprising one or more processors and one or more non-transitory storage media;

wherein the one or more storage media are configured with instructions that, when executed, cause the hardware system to be operative to:

receive as input a reference video comprising a time sequence of frames;

calculate global camera motion parameters for a plurality of the frames of the reference video;

identify events using at least one of the processors, the identifying including including—frames corresponding to scene-change-based and/or motion-based an/or sub-sampling-based events in the reference video, the identifying of the motion-based events using the global camera motion parameters calculated for the reference video;

generate hash values for the identified frames and their neighboring frames in the reference video, the hash values comprising, for each identified event, one or more binary descriptors for one or more frames of the frames that correspond to the identified event; and store the identified frames of the reference video in and the generated hash values for the reference video, the storing in at least one of the one or more storage media, wherein the identifying the frames in the reference video includes identifying frames corresponding to one or more of a change-of-motion-based reference-video event identified by detecting a change of motion in the sequence, a sub-sampling-based reference-video event determined by sub-sampling in time the ordered time sequence according to a pre-determined sampling profile, and a detected change-of-scene-based reference-video event, such that the stored identified frames and stored hash values are retrievable to be used for evaluating a measure of similarity of a video and the reference video.

20. A system as recited in claim 19, wherein the instructions when executed, further cause the hardware system to be operative to:

receive as input a subject video comprising a time sequence of subject-video frames;

calculate global camera motion parameters for the subject video for each frame of the subject video;

identify subject video frames corresponding to scene-change-based subject video events and/or motion-based subject video events in the subject video, the identifying subject video frames of the motion-based subject video events using the global camera motion parameters calculated for the subject video, wherein the identifying the frames in the subject video includes identifying frames corresponding to one or more of a change-of-motion-based subject-video event identified by detecting a change of motion in the sequence, a sub-sampling-based subject-video event determined by sub-sampling in time the ordered time sequence according to the pre-determined sampling profile, and a detected change-of-scene-based subject-video event;

generate subject video hash values for the identified subject video frames and their neighboring frames in the subject video, using the global camera motion parameters for the subject video; and evaluate a measure of similarity of the subject video and the reference video by a process that includes comparing identified subject video frames and the generated subject video hash values with the stored identified reference-video frames and stored reference-video hash values.

21. A system as recited in claim 19, wherein the one or more storage media include at least one memory, and at least one mass storage device, local or remote coupled to the hardware system via a network.

* * * * *